United States Patent
Allagadapa et al.

(10) Patent No.: US 9,870,598 B2
(45) Date of Patent: Jan. 16, 2018

(54) LOW COMPLEXITY ADAPTIVE FILTERING FOR MOBILE CAPTURES

(71) Applicant: NVIDIA Corporation, Santa Clara, CA (US)

(72) Inventors: Varun Kumar Allagadapa, Bangalore (IN); Niranjan Avadhanam, Bangalore (IN); Thrinadh Kottana, Bangalore (IN); Shalini Gupta, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 89 days.

(21) Appl. No.: 13/956,735

(22) Filed: Aug. 1, 2013

(65) Prior Publication Data

US 2016/0284060 A1 Sep. 29, 2016

Related U.S. Application Data

(60) Provisional application No. 61/816,644, filed on Apr. 26, 2013.

(51) Int. Cl.
| | |
|---|---|
| G06K 9/00 | (2006.01) |
| G06T 1/20 | (2006.01) |
| G06T 5/00 | (2006.01) |
| G06T 5/50 | (2006.01) |
| H04N 5/228 | (2006.01) |
| G06K 9/46 | (2006.01) |

(52) U.S. Cl.
CPC .............. *G06T 1/20* (2013.01); *G06T 5/002* (2013.01); *G06T 5/50* (2013.01); *G06K 9/4661* (2013.01); *G06T 2207/10016* (2013.01); *G06T 2207/20004* (2013.01); *G06T 2207/20182* (2013.01)

(58) Field of Classification Search
USPC ........ 382/100, 103, 106–107, 140, 162–168, 382/181, 219, 232, 254, 274, 276, 291, 382/305, 312, 321, 233; 348/242, 620, 348/231.99, 208.4, 275; 375/240.16
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,642,684 A | 2/1987 | Alkofer |
| 4,739,495 A | 4/1988 | Levine |
| 4,920,428 A | 4/1990 | Lin et al. |
| 5,446,831 A | 8/1995 | Yamashita et al. |
| 5,652,621 A | 7/1997 | Adams, Jr., et al. |
| 5,667,944 A | 9/1997 | Reem et al. |
| 5,850,470 A | 12/1998 | Kung et al. |
| 6,038,339 A | 3/2000 | Hubel et al. |
| 6,377,702 B1 | 4/2002 | Cooper |
| 6,573,932 B1 | 6/2003 | Adams, Jr., et al. |
| 6,683,643 B1 | 1/2004 | Takayama et al. |

(Continued)

*Primary Examiner* — Seyed Azarian (57) ABSTRACT

A method of noise filter parameter adaptation, the method comprising receiving a current video frame comprising a plurality of pixels. A table lookup is performed, using current statistical values associated with the current video frame. Noise filter parameters are adapted, based on current lighting conditions as determined from the performed table lookup. The current lighting conditions correspond to the current statistical values. The current video frame is noise filtered as defined by the adapted noise filter parameters.

19 Claims, 7 Drawing Sheets

(56) References Cited

U.S. PATENT DOCUMENTS

| | | |
|---|---|---|
| 6,724,422 B1 | 4/2004 | Werner |
| 6,724,932 B1 | 4/2004 | Ito |
| 6,785,814 B1 | 8/2004 | Usami et al. |
| 6,873,727 B2 | 3/2005 | Lopez et al. |
| 6,900,836 B2 | 5/2005 | Hamilton, Jr. |
| 6,992,709 B1 | 1/2006 | Raj et al. |
| 7,009,639 B1 | 3/2006 | Une et al. |
| 7,092,018 B1 | 8/2006 | Watanabe |
| 7,133,072 B2 | 11/2006 | Harada |
| 7,184,080 B2 | 2/2007 | Kehtarnavaz et al. |
| 7,277,575 B2 | 10/2007 | Baqai et al. |
| 7,305,148 B2 | 12/2007 | Spampinato et al. |
| 7,352,894 B2 | 4/2008 | Dolan et al. |
| 7,450,160 B2 | 11/2008 | Takahashi et al. |
| 7,486,844 B2 | 2/2009 | Chang et al. |
| 7,502,505 B2 | 3/2009 | Malvar et al. |
| 7,522,767 B2 | 4/2009 | Baker et al. |
| 7,542,077 B2 | 6/2009 | Miki |
| 7,551,207 B2 | 6/2009 | Yuyama |
| 7,576,797 B2 | 8/2009 | Kehtarnavaz et al. |
| 7,593,043 B2 | 9/2009 | Uezono |
| 7,616,810 B2 | 11/2009 | Dolan et al. |
| 7,630,107 B2 | 12/2009 | Ichikawa et al. |
| 7,643,068 B2 | 1/2010 | Hyodo |
| 7,671,910 B2 | 3/2010 | Lee |
| 7,705,892 B2 | 4/2010 | Uezono |
| 7,830,419 B2 | 11/2010 | Sakurai |
| 7,885,458 B1 | 2/2011 | Lin |
| 9,042,667 B2 * | 5/2015 | Venkataraman .......... G06T 9/00 382/233 |
| 2009/0323808 A1 * | 12/2009 | Lin .................... H04N 19/139 375/240.16 |
| 2010/0214448 A1 * | 8/2010 | Ouzilevski ................ G06T 5/20 348/231.99 |
| 2012/0026368 A1 * | 2/2012 | Cote .................... G06T 3/4015 348/242 |
| 2013/0083246 A1 * | 4/2013 | Chen ..................... G06T 5/002 348/620 |

\* cited by examiner

LOW COMPLEXITY ADAPTIVE FILTERING FOR MOBILE CAPTURES

CROSS-REFERENCES TO RELATED APPLICATIONS

This Application claims priority to U.S. Provisional Application 61/816,644, filed Apr. 26, 2013, entitled "LOW COMPLEXITY ADAPTIVE TEMPORAL FILTERING FOR MOBILE CAPTURES," by Allagadapa, et al., which is hereby incorporated herein by reference.

TECHNICAL FIELD

The present disclosure relates generally to the field of photo/video capture processes, and more specifically to the field of noise reduction in photo/video capture processes.

BACKGROUND

Photo and/or video captures are an important use for smartphones and tablet devices, as well as any personal electronic device with a photo and/or video capture capability. An exemplary video sensor may be used in a video capture apparatus to capture and digitize a photograph or video as a digital photograph and a digital video, respectively. However, a video capture apparatus found in a portable electronic device may suffer from a high degree of sensor noise, especially in non-ideal lighting conditions. For example, when a lighting level is low, a sensor tends to introduce noise as there is not enough light to adequately represent the scene. The end result is a captured image or video with a quantity of noise on top of the image or video. Unacceptable levels of noise may also be found in a preview display output as well.

Noise introduced into video data may result in further noise or video artifacts during digitization. A video encoder, which digitizes the video data produced by the sensor, has limits on the amount of noise it is able to handle. When noise is introduced into the video, the resulting output of the video encoder may be a digitized video with additional noise and artifacts. In other words, the captured video data may have more noise and artifacts introduced into it because of the initial level of noise in the video, such that the quality of the captured video may be even worse than the quality of the preview display video.

Processing captured video to reduce the levels of noise introduced into the video may significantly improve the quality of the overall video capture process. The noise levels in the captured video may be reduced through noise filtering. However, the extent of the noise filtering may be limited by the processing capability of the video capture apparatus. Not only is the processing capabilities of a video capture apparatus found in a portable electronic device limited, an amount of time available for budgeting towards real-time processing of the captured video by the video capture apparatus is also limited.

SUMMARY OF THE INVENTION

This present invention provides a solution to the increasing challenges inherent in adequately filtering noise from a photo/video capture in changing light conditions and/or changing locations (e.g., indoor and outdoor). In a method according to one embodiment of the present invention, a method for adaptive noise filtering that adjusts based on changing light levels and whether the photo/video is captured indoors or outdoors is disclosed.

In one embodiment, a method of noise filter parameter adaptation is disclosed. The method comprises receiving a current video frame comprising a plurality of pixels. A table lookup is performed, using statistical values for the current video frame. Noise filter parameters are adapted, based on current lighting conditions as determined from the performed table lookup. The current video frame is noise filtered as defined by the adapted noise filter parameters.

In one embodiment, a method of noise filter parameter adaptation is disclosed. The method comprises adapting noise filter parameters for each pixel of a first portion of pixels of a current video frame based on current lighting conditions and on a determined amount of motion in each pixel of the first portion of pixels. Adapted noise filter parameters are borrowed for each pixel of a second portion of pixels of the current video frame from one of neighboring pixels that are part of the first portion of pixels, and co-located pixels from a previous frame. Each pixel of the current video frame is noise filtered as defined by their corresponding adapted noise filter parameters.

In one embodiment, an apparatus for adapting noise filter parameters is disclosed. The apparatus comprises a video sensor operable to generate a video frame comprising a plurality of pixels, an image signal processor operable to generate statistical values, and a memory comprising a plurality of lighting conditions related to corresponding statistical values. The statistical values related to a current video frame are used to select a current lighting condition from the plurality of lighting conditions. The apparatus also comprises a noise filter operable to filter noise from the plurality of pixels as defined by adapted noise filter parameters. The noise filter parameters are adapted based on the current lighting conditions.

In one embodiment, a temporal filter adaptation method based on an amount of motion and ambient light conditions is disclosed. In one embodiment, an ambient lighting based power law adaptation for alpha versus SAD is disclosed. In another embodiment, a blending method which combines the spatially and temporally filtered pixels to produce a visually pleasing output is disclosed. This blending method takes into account ambient light conditions and the amount of motion in the scene. In another embodiment, an adaptation method (which adapts to a level and visibility of noise) which uses statistics from an image signal processor (ISP) to tune the filtering based on ambient conditions is disclosed.

In another embodiment, a reduction method which trades off complexity with noise reduction performance is disclosed. In one embodiment user-selectable features enable adaptive noise filtering where power and computational power budgets are limited. This method controls filter adaptation based on video content and ambient lighting. In one embodiment N out of M pixels are adapted in each frame, using the same parameters for processing all of the M pixels. In one embodiment, pixels are adapted in a partial frame and for the pixels in the rest of the frame, and re-using the adapted parameters from co-located pixels of the previous frame. The adaptation of the whole frame is also refreshed in a cycle of N frames.

BRIEF DESCRIPTION OF THE DRAWINGS

Embodiments of this present invention will be better understood from the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Adaptive Temporal Filtering of Photo/Video Captures:

This present invention provides a solution to the increasing challenges inherent in adequately filtering noise from a photo/video capture in changing light conditions and/or changing locations (e.g., indoor and outdoor). As discussed in detail herein, various embodiments of the present disclosure provide scalable adaptive noise filtering that adjusts based on changing light levels and whether the photo/video is captured indoors or outdoors. As discussed herein, the noise filter adaptation may be for all the pixels of a video frame or for a portion of the pixels of the video frame.

Figure 1:
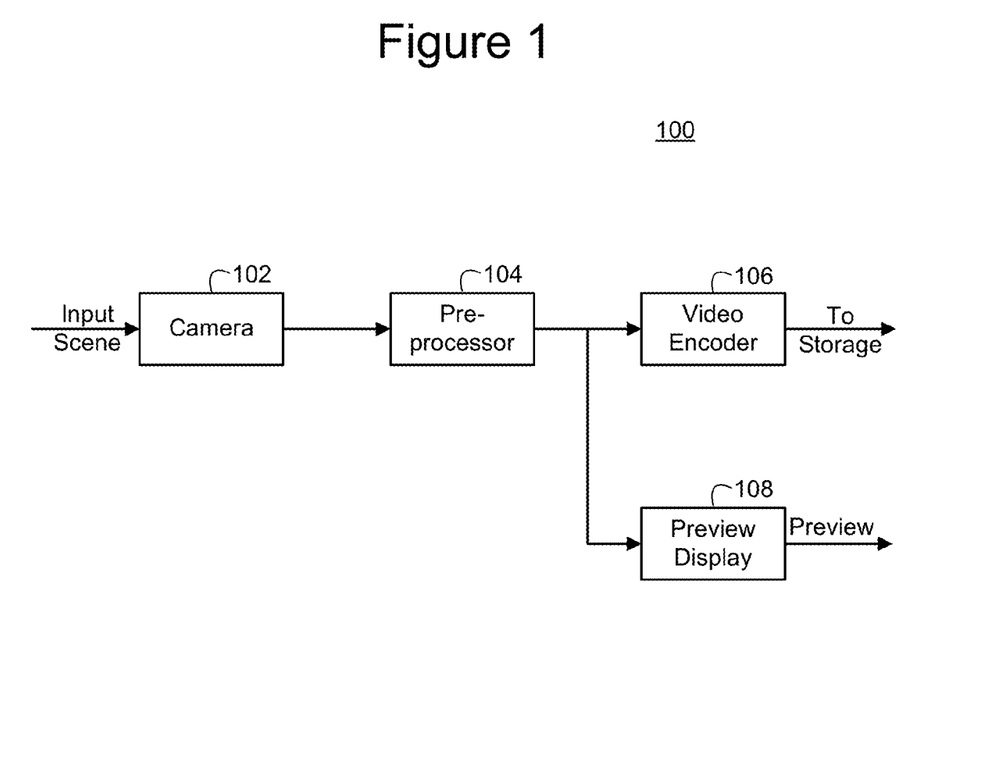
FIG. 1 illustrates an exemplary simplified block diagram of a video capture pipeline in accordance with an embodiment of the present invention.

FIG. 1 illustrates an exemplary video capture pipeline 100. In one embodiment, a video capture pipeline 100 comprises a camera module 102, a pre-processor module 104, a video encoder 106 and a preview display 108. In one embodiment, during low light conditions, noisy data from the camera module 102, when not corrected by the pre-processor module 104, may go directly to the preview display 108 and the video encoder module 106. As discussed herein, noise reduction may improve not only the preview display experience, but may also reduce encoding artifacts in the final capture. If the noise levels are not reduced, the video encoder module 106 used to generate the final capture may allocate a significant portion of the bit rate to the noise, thereby allocating less bitrate to code the actual video features. Hence, suppression of this noise prior to encoding may assure a noise-reduced video output, and also preserve important image structure and features present in the original video.

Figure 2:
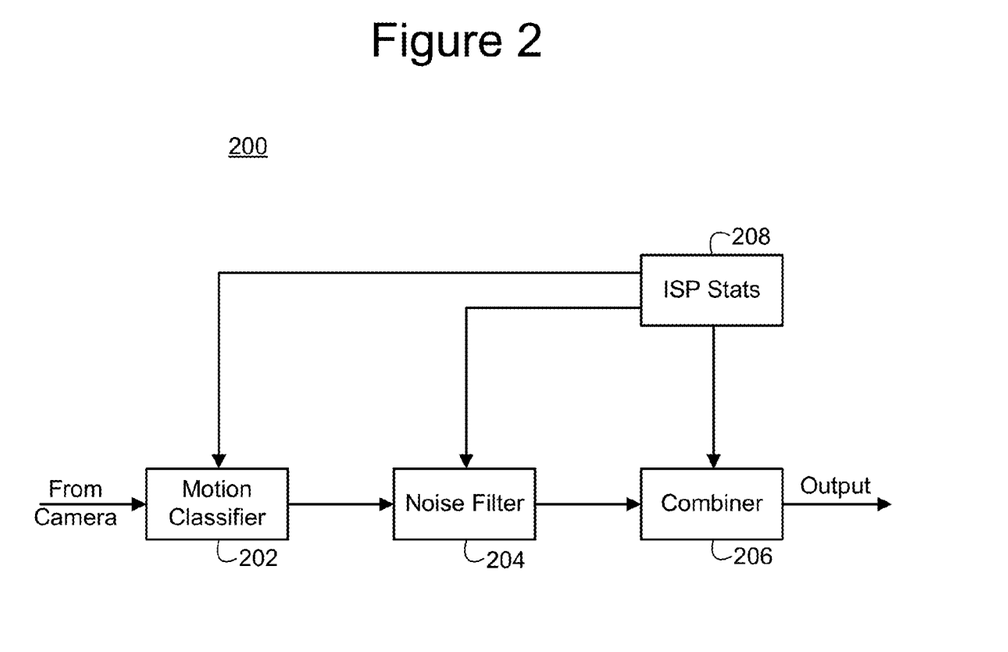
FIG. 2 illustrates an exemplary simplified block diagram of a noise reduction system in accordance with an embodiment of the present invention.

Noise Reduction:

FIG. 2 illustrates an exemplary noise reduction system 200 comprising a motion classifier module 202, a noise filter 204, and a combiner 206. As also illustrated in FIG. 2, the motion classifier module 202, noise filter module 204, and combiner module 206 receive image statistics 208 from an image signal processor (ISP). In one embodiment, image and/or video data from a sensor is processed by an image signal processor. During the course of the image/video processing, a wealth of statistics 208 may be generated by the image signal processing. As described herein, these statistics 208 may be used by the noise reduction system to adapt the noise filtering to changing lighting conditions.

The ISP statistics 208 may contain a wealth of information about ambient lighting conditions. As described in detail herein, these statistics 208 may be used by the motion classifier module 202 during a motion classification process of an input scene, by the noise filter 204 to adapt noise filter parameters, and by the combiner 206 to define how the noise reduced data is combined to produce a visually-pleasing video output. As also illustrated in FIG. 2, the noise filter module 204 may also adapt to the motion information output from the motion classifier module 202.

Figure 3:
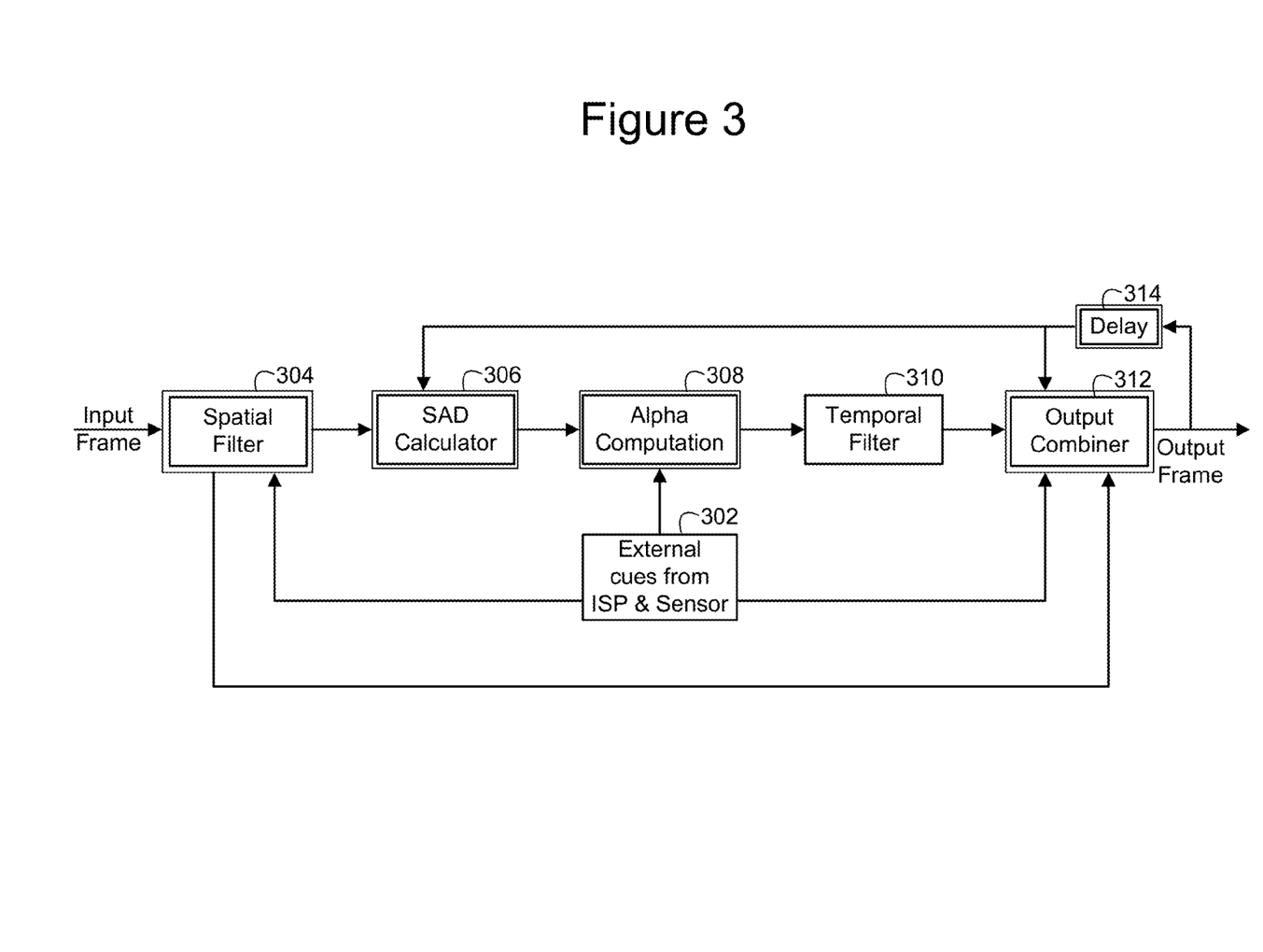
FIG. 3 illustrates an exemplary simplified block diagram of a motion-adaptive temporal filtering system in accordance with an embodiment of the present invention.

In one embodiment, as described herein, the noise filter 204 may provide spatial filtering and temporal filtering. As noted above, the motion classifier module 202 may classify those portions of a frame as to their level of motion (e.g., whether a pixel is determined to have a high level of motion, an intermediate level of motion, or stationary). If a pixel is determined to have no motion, then the temporal filter may be strongly applied as there should not be any risk of the temporal filtering introducing any blurring or spoiling the motion. In those pixels where a degree of motion has been determined, there may be little temporal filtering. However, as illustrated in FIG. 3 and discussed herein, even when there is no temporal filtering, a pixel may still be spatially filtered. Separate spatial filter and temporal filter outputs will be combined together in the combiner module 206. As illustrated in FIG. 2, and discussed herein, the combining of the spatial filter output and the temporal filter output in the combiner module 206 may be defined and controlled by the ISP stats 208.

FIG. 3 illustrates an exemplary block diagram of motion-adaptive temporal filtering. In one embodiment, ISP statistics 302 may be used to control the spatial filter 304, the translation of motion information to temporal filter strength in the alpha computation module 308, and the action of the output combiner module 312. Each module is discussed in detail herein.

In one embodiment, the spatial filter module 304 applies an N×N spatial kernel at every pixel of a noisy input frame to generate a spatial filter output. In one embodiment, a 3×3 or 5×5 spatial kernel is applied. In another embodiment, a low pass filter is applied. As illustrated in FIG. 3, the output of the spatial filter module 304 is communicated to a Sum of Absolute Difference (SAD) calculator module 306 and an output combiner module 312. In one embodiment, the spatial filter module 304 may reduce the noise in the input frame and hence increase the reliability of a SAD metric which represents the motion quality of a pixel.

In one embodiment, the SAD calculator module 306 may be used to produce a motion classification metric. SAD values may be computed between a current spatially filtered frame and a previous output frame. In one embodiment, 3×3 spatial neighborhood pixels may be considered while calculating the SAD. For example, the SAD may be calculated using the following:

$$SADp = \sum_{i=0}^{N} abs(SF(i) - PO(i)) \quad (1)$$

Where, SF denotes a 3×3 neighborhood of pixel p in a spatial filtered frame, and PO denotes a 3×3 neighborhood of pixel p in a previously filtered frame. Other SAD methods/neighborhoods may be used. In one embodiment, any type of SAD (e.g., pixel-wise, block-based) may be used. As illustrated in FIG. 3, SAD values, output from the SAD calculator module 306, may be used to compute an alpha value.

In one embodiment, as defined by a current SAD value, the alpha computation module 308 outputs a parameter (referred to as an alpha value) that is a parameter of a first order IIR filter which combines a previously filtered output and a current noisy input frame to generate a temporal filtered output (as illustrated in equation 3 below). As illustrated in FIG. 3, the alpha computation module 308 computes the alpha value as a function of an output from the SAD module 306 and external cues from the ISP and Sensor data 302. Based on cues from the ISP 302, each frame may be categorized into three different lighting conditions, such as: low, medium, and bright or high light intensity, and into two viewing conditions: indoor and outdoor. Therefore, in one exemplary embodiment, there may be six conditions: indoor low, medium, and high; and outdoor low, medium, and high. In other embodiments, other classifications of lighting conditions and viewing conditions may be used to result in more or fewer conditions.

Input noise levels and their visibility are highly dependent on ambient conditions. For example, lower light captures may have higher noise levels and are particularly bothersome in indoor scenes. Alpha values may be calculated as a function of SAD, as illustrated below:

$$\alpha = \frac{(Mpv - \min(Mpv, K*SAD))}{Mpv} \quad (2)$$

Where, Mpv=Maximum Pixel value (depends on the number of bits used to represent one pixel). K is a variable which depends on the lighting condition from ISP, and SAD=Sum of Absolute Difference.

As discussed herein, lighting conditions may be used to define a level of noise filtering. For example, when a lighting condition is determined to be an outdoor scene with medium or high lighting conditions, then there will not be much noise, and therefore, very little noise filtering will be performed. An exemplary lighting condition that may result in a variety of noise filtering is an indoor medium lighting condition. Such a lighting condition may be found in homes or office buildings during day light hours. Typical activities include video conferencing, where users will be very sensitive to noise in the video.

Figure 4:
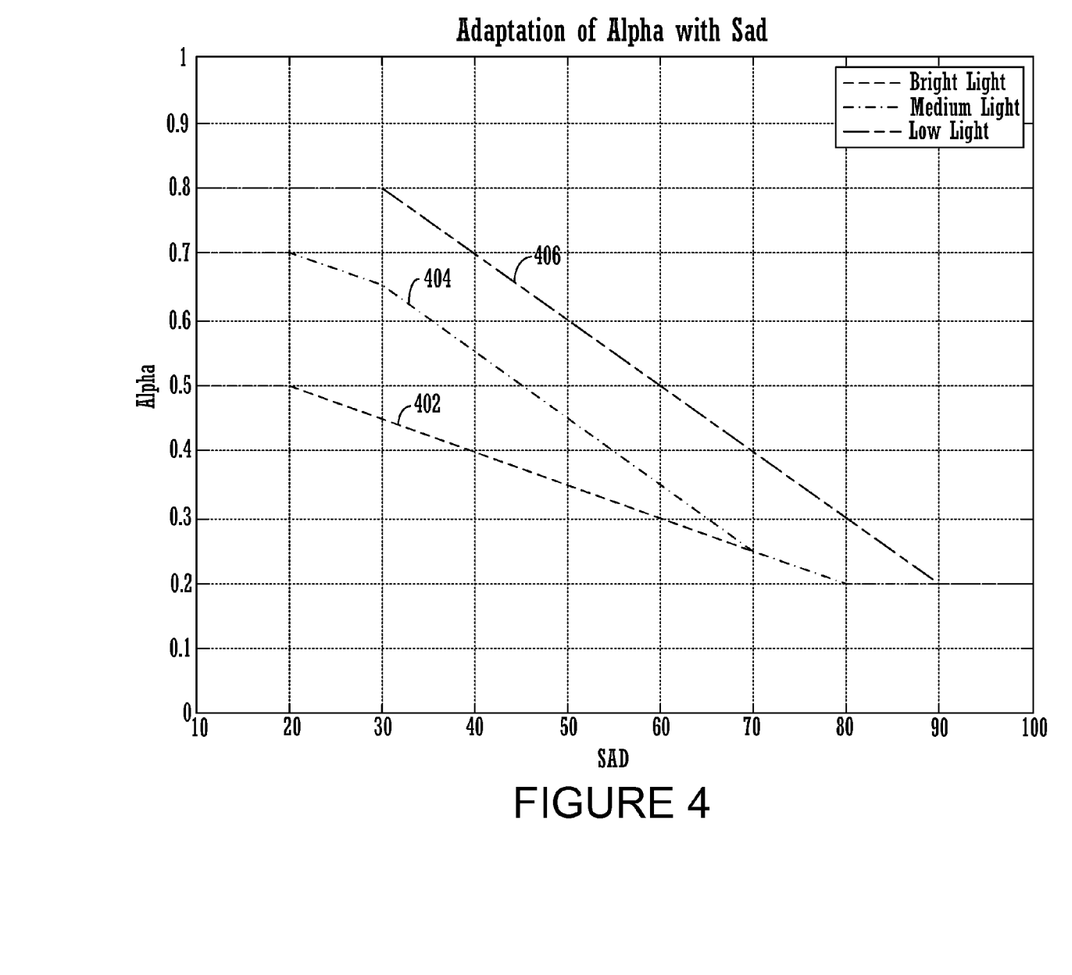
FIG. 4 is an exemplary graph illustrating an exemplary alpha value adaptation based on lighting levels in accordance with an embodiment of the present invention.

If a particular pixel has a high level of motion, then a correlation between the current pixel and a co-located pixel in the previous frame will be less, which leads to higher SAD values. From the above power law, a SAD value and an associated alpha value are inversely proportional. K is a constant which affects the slope of the above equation to get appropriate alpha values for all lighting conditions. FIG. 4 is a graph illustrating typical "K" values for different lighting conditions according to an exemplary power law, such as illustrated above. FIG. 4 illustrates exemplary relationships between SAD values and selected alpha values.

As illustrated in FIG. 4, when SAD values increase (indicating there is more motion in a current frame for a particular pixel), a lower alpha value may be selected (to reduce temporal filtering). In other words, for different lighting conditions, a different alpha adaption may be needed. As illustrated in FIG. 4, there may be different curves used, depending on the lighting conditions. In one embodiment, a curve may have minimum, maximum, and transition areas. In one embodiment, the curve may be any function of choice, e.g., linear and/or nonlinear. For low lighting conditions, a higher level of alpha may be needed because users may be much more sensitive to noise and less sensitive to blurring. Therefore, there may be a trading off of an increase in blur for a reduction in noise.

In one embodiment, a temporal filter module 310 comprises a first order IIR filter that produces a temporally filtered output using the alpha value calculated above. In one embodiment, this produces an output y(t) by applying recursively alpha blending of a current frame x(t) with a previous temporally filtered frame y(t−1):

$$y(t) = \alpha y(t-1) + (1-\alpha)x(t) \qquad (3).$$

In one embodiment, an output combiner module 312 performs a weighted blending of the temporal filtered output y(t) with the spatial filtered output S(t), to generate output Z(t):

$$Z(t) = \beta S(t) + (1-\beta)y(t) \qquad (4),$$

Where, Beta is the spatial contribution coefficient $\beta = F(\alpha)$. The Spatial contribution coefficient in the output combiner module 312 depends on the ambient conditions as well; a simple example of it is $\beta = 1 \alpha$. The spatial contribution in the output combiner module 312 is controlled by a coefficient that depends on current ambient lighting conditions. In one embodiment, as discussed above, the coefficient may be "1−α." However, the coefficient may be any function of alpha.

External Cues For Adaptive Noise Reduction:

In one embodiment, as discussed herein, noise levels and their visibility may be highly dependent on ambient conditions. Therefore, a lighting-condition aware filter selection for noise reduction may perform better, as compared to a lighting-condition agnostic filter selection for noise reduction (that is, without the knowledge of the ambient lighting conditions). In one exemplary digital camera system, both an image sensor and an image signal processor (ISP) may define the quality of the image/video. A typical ISP may consist of many modules, such as: auto exposure, auto focus, and auto white balance (also referred to herein as 3A), flicker correction, and lens shading, etc. These exemplary modules process the captured image from the sensor and generate statistics. In another embodiment, any set of appropriate ISP statistics may be used, such that the ISP statistics are not limited to only lux values, exposure values, white balancing gains, and correlated color temperature values.

In one embodiment, the statistics from these modules may be collected by the ISP statistics engine which can be accessed by other hardware (HW) or software (SW) processing modules. Statistics from the 3A modules, such as Lux (quantity of illumination), exposure values, white balancing gains (WB0, WB1, WB2, and WB3 are for R, Gr, Gb, and B channels respectively), and a correlated color temperature (CCT) may be used to distinguish the ambient lighting conditions. In addition, information about the processing inside the ISP may be useful for adapting the noise reduction to the noise level visibility.

In one embodiment, combinations of the above described ISP statistics (herein referred to as "clustering") may be used to aid in adapting noise filtering to changing lighting conditions. A cluster of ISP statistics may be used to identify a variety of ambient lighting characteristics. The ambient lighting characteristics may include light sources (e.g., natural and artificial light), scenes (e.g., indoor and outdoor), and lighting levels (e.g., low, medium, and bright). In one embodiment, a cluster of ISP statistics may also be used to determine whether a frame or a portion of a frame is in shadow. In one embodiment, the exemplary clustered ISP cues may be used to categorize a scene as indoor or outdoor, and low, medium, or high lighting conditions.

Figure 5:
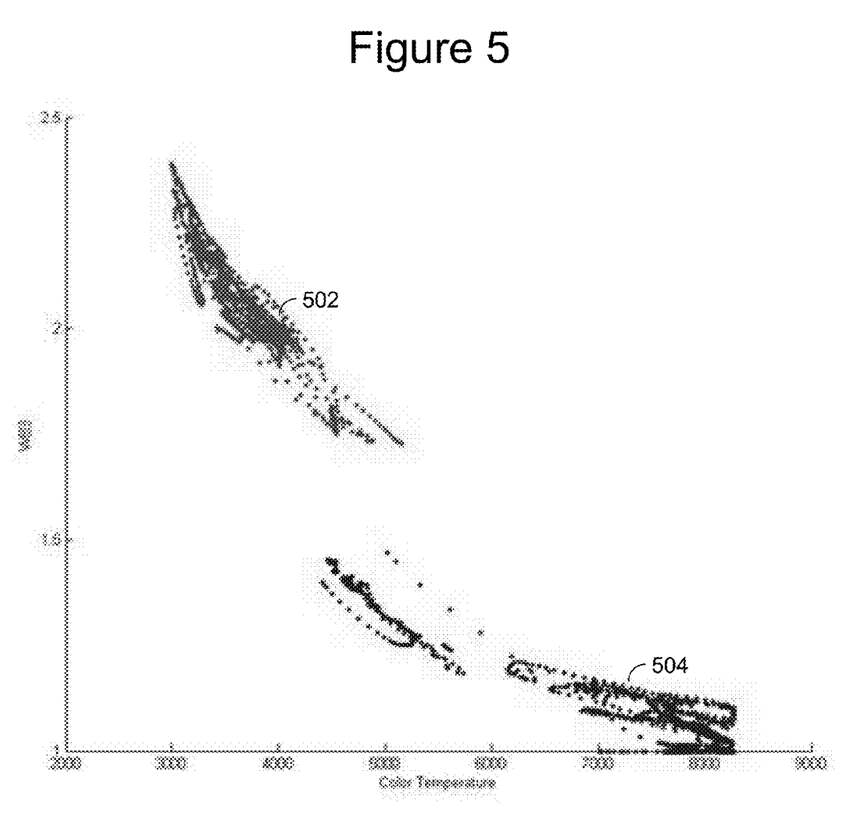
FIG. 5 is an exemplary graph illustrating an exemplary plotting of indoor versus outdoor scene sampling in accordance with an embodiment of the present invention.

In one embodiment, a variety of photo/video captures under various conditions are captured and analyzed to characterize a particular sensor. Such analysis may be used to capture variations in noise level as well as variations in noise level visibility. Such an exemplary classification based on the ISP data may help a noise reduction process to choose between different filter setting for various noise levels. FIG. 5 is a graph illustrating a plotting of samples from indoor and outdoor scenes and how they cluster significantly apart when an X-axis of the graph defines a color temperature of the individual samples and a Y-axis of the graph defines a WB3 value of the individual samples. For example, a first set of samples 502 are from indoor captures, while a second set of samples 504 are from outdoor captures. In other words, FIG. 5 illustrates how a clustering of CCT and WB3 statistical values may be used to determine whether a frame is indoors or outdoors. FIG. 5 illustrates how the clustering of values, and not their values alone, can provide meaningful lighting condition information.

In one embodiment, the analysis described above, which is used to drive an adaptation of noise reduction processes, may be computationally complex, and is performed off-line. In one embodiment, this exemplary analysis may be performed upfront and hence does not contribute to the complexity of a real-time adaptive noise filtering process. In one embodiment, a quantity of data for a particular sensor may be collected under a number of lighting conditions: indoor, outdoor, and low, medium, and high lighting conditions. Then statistics from the ISP are used with the collected data to characterize how particular clustered ISP statistics correlate to different lighting conditions.

Therefore, once a particular sensor has been characterized and statistical clustering has been performed to correlate the lighting conditions to the statistical values, this off-line analysis may be used to build a table that may then be accessed with current real-time ISP statistics. For example, for a given set of clustered statistics, a given predetermined lighting condition (as defined by a table lookup) can be identified. In other words, based on current clustered ISP statistics, a table lookup may be performed which identifies that the current clustered ISP statistics correlate to an indoor, medium lighting condition.

In one embodiment, when video is produced by a sensor and processed by an ISP, generated real-time ISP statistics may be utilized by an adaptive noise filtering process to access a table and based upon current clustered ISP statistical values, determine a current lighting condition. Therefore, in one embodiment, an adaptive noise filtering process receives current ISP stats, looks up a lighting condition table with the real-time ISP statistics to determine lighting conditions, and uses the determined lighting conditions to select a particular filter adaptation. When a scene has changed, the ISP statistics will also change, and a new table lookup will indicate different lighting conditions (if the lighting level has dropped, more noise filtering may be indicated).

As discussed herein, current lighting conditions may be used to adaptively adjust noise filter parameters, such that the noise filtering may be increased or reduced depending on whether the scene is indoors or outdoors, and whether the lighting levels are high or low. In one embodiment, an indication of an outdoor scene may be used to scale back the noise filtering, while an indoor or outdoor scene, but with increasingly lower light levels may also be adjusted to ensure a pleasing user experience.

Scalable Complexity of Noise Reduction:

As lighting conditions change, the amount of noise filter adaptation may also change. Such changing noise filter adaptation needs may also result in a changing computational demand. However, if a processor is already performing at a high level, an increasing complexity of noise filter adaptation may not be possible. In other words, the available computation budget may be limited.

In one embodiment, an exemplary noise reduction process, as described herein, may be broken down into two parts: filter adaptation and actual filtering. The adaptation blocks contribute to the computational requirements. As illustrated in FIG. 3, the modules illustrated with double lines (e.g., the spatial filter module 304, the SAD calculator module 306, the alpha computation module 308, the output combiner module 312, and the delay module 314) form part of the adaptation, while the temporal filter module 310 performs filtering without adding computational requirements. In one embodiment, both the spatial filter module 304 and the temporal filter module 310 perform filtering without adding computational requirements. In one embodiment, the external cues from the ISP & sensor 302 do not contribute to real-time complexity as it may be computed off-line.

In one embodiment, SAD and alpha calculations do not need to be performed for every frame of video data, so that when a processor is computationally or power restricted, only a portion of a frame's noise filtering will be adapted. Therefore, as discussed herein, the complexity of the noise reduction process may be scaled by selectively turning the adaptation on/off, which enables noise reduction as described herein on electronic devices with very little computational resources. In addition, this scalable complexity process may be used to control power consumption by the process when it is run on electronic devices which are power constrained. There may be a trade-off between noise reduction quality and complexity, and the optimal tradeoff may depend on the ambient lighting conditions as well. For example, in indoor video conferencing scenes, the visibility and the levels of noise might allow for the lowering of the complexity of the noise reduction process. In addition, this control may be exposed as a user-selectable option.

Figure 6:
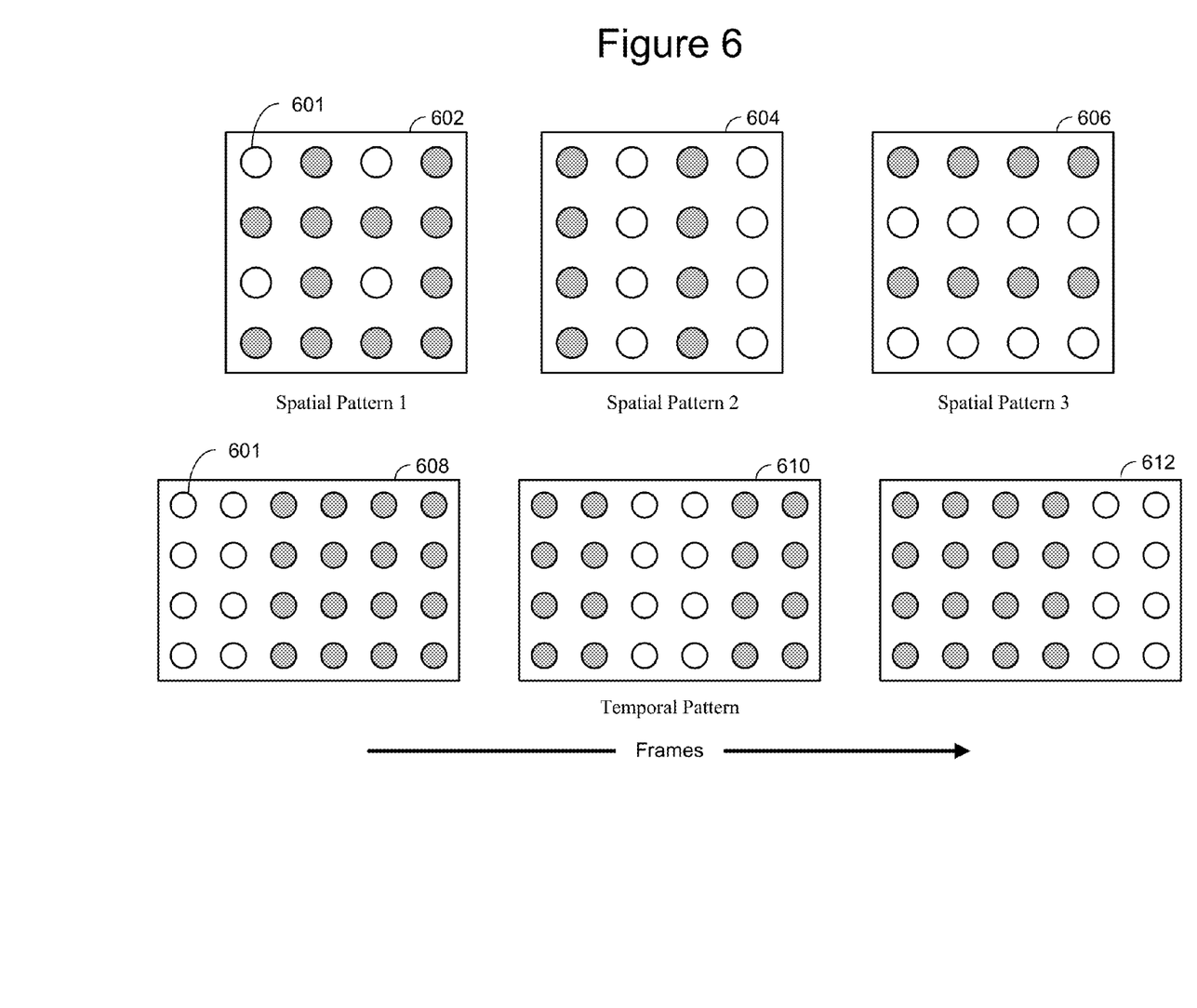
FIG. 6 illustrates exemplary pixel patterns for complexity scalability in accordance with an embodiment of the present invention.

FIG. 6 illustrates several options for scalable complexity. In a first row of FIG. 6, for each video frame in the video capture, the adaptation may be turned off for selected pixels 601 (illustrated in gray), while for the rest of the pixels 601 (illustrated in white), both adaptation as well as filtering operations are computed. The gray pixels 601 borrow the adaptation parameters from the nearest white pixels 601. The patterns illustrated in FIG. 6 are exemplary in nature, with other patterns possible. Three spatial patterns 602, 604, and 606 are illustrated in FIG. 6. In one embodiment, a gray pixel 601 that is borrowing adaptation parameters from a nearest white pixel 601 may borrow from one or more neighboring white pixels 601. Therefore, during an adaptation phase before filtering begins, only a portion of the pixels have new adaptation parameters determined, with the remainder borrowing new adaptation parameters from neighboring pixels with new adaptation parameters, then during filtering, all pixels are filtered according to their updated adaptation parameters (whether newly calculated or borrowed).

In one exemplary embodiment, overall lighting conditions on a frame are consistent and may be used for all the pixels. In one embodiment, one or more lighting conditions may be used for clusters of pixels in a frame. In one embodiment, motion information and structure information changes for each pixel. However, as long as the parameter values borrowed are proximal to determined values, the noise filtering will still be effective. In other words, for pixels that borrow filter adaptation values from a neighboring pixel, there might be different motion information or different structures between the two or more pixels, but because the pixels are proximal, the differences will not be too severe and the noise filtering will be close enough. This becomes more and more important in low light conditions. A given frame may be dramatically filtered without have to perform as much adaptation.

In a second row of FIG. 6, termed a temporal pattern, a scalable complexity is illustrated which may be achieved temporally (over multiple frames), where a vertical patch of the current video frame has both adaptation and filtering turned on (again, shown in white) while the rest of the frame borrows the same parameters from co-located pixels of the previous frames and performs only the filtering. This patch is then slid across the frame so that at the end of N frames, all pixels 601 in the frame will have been refreshed (their adaptation completed), as illustrated in the second row of FIG. 6. By using the processes described herein, various levels of complexity may be traded off with a consequent compromise in quality. In one embodiment, half the pixels 601 may be adapted each frame, or some other portion of the pixels 601 in the frame.

As discussed herein, the scalable complexity of filter adaptation is for adjusting a quantity of pixels that receive adaptive temporal filtering and has no effect on the ISP statistical clustering which is used to determine what the current lighting conditions are. In other words, if a scene has motion, but two pixels do not have much difference, then one of them may borrow the temporal filter adaptation from the other which uses the current determined lighting conditions to complete the full noise filter adaptation.

In one embodiment, a spatial pattern or temporal pattern for scalable complexity of adaptation may be used when a processor computation budget for noise filter adaptation is limited, or in situations where there is not much change and adaptation is not really required. For example, when there is not much motion in a frame, the same parameters could be reused in many of the pixels. In one embodiment, pixels may be selected for adaptation based on whether there is motion in that area of the frame. However, a fixed cycle of adaptation may allow a computation of how much power savings will be provided. If a pixel is refreshed every N frames, then a set amount of computation and power savings may be quantized, based on the value of N.

Figure 7:
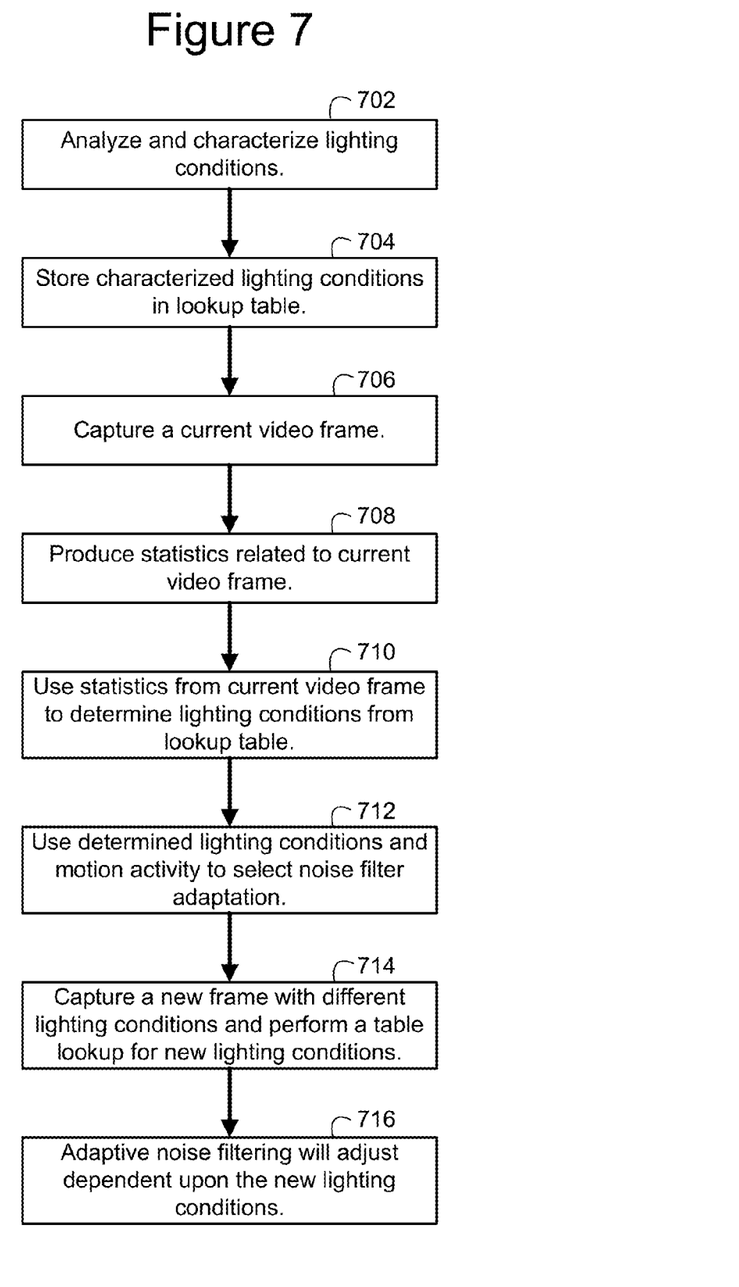
FIG. 7 illustrates an exemplary flow diagram, illustrating computer executed steps of a method of adaptive noise filtering in accordance with an embodiment of the present invention.

FIG. 7 illustrates the steps to a computer implemented method for selective, adaptive noise filtering. In step 702 of FIG. 7, a plurality of samples from a sensor are captured and analyzed by a processor with processor statistics clustered and analyzed to characterize lighting conditions for the sensor. In step 704 of FIG. 7, the characterized lighting conditions are stored in a lighting condition look up table.

In step 706 of FIG. 7, a current video frame is captured by the sensor. In step 708 of FIG. 7, the processor produces statistics related to the current video frame. In step 710 of FIG. 7, the statistics related to the current video frame are used to perform a lookup operation of the lighting condition look up table to determine lighting conditions. In step 712 of FIG. 7, the determined lighting conditions and determined motion activity for each pixel of the current frame are used to select a particular filter adaptation for each pixel of the current video frame. As discussed herein, once the filter adaptation has been completed, the noise filtering may be performed on the current video frame.

In step 714 of FIG. 7, when a new video frame has been captured with a different scene and different lighting conditions, a new lighting condition table look up will indicate new lighting conditions. In step 716 of FIG. 7, the adaptive filtering will adjust dependent upon the new lighting conditions (before performing the noise filtering on the new video frame).

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of noise filtering, the method comprising:
receiving a video frame comprising video data for a plurality of pixels;
performing a table lookup in a table to determine a lighting condition for the video frame, wherein the table comprises a plurality of lighting conditions, wherein each of the plurality of lighting conditions in the table corresponds to a particular set of statistical values, wherein the table lookup is performed using statistical values generated from the video data in the video frame, and wherein the table lookup comprises using the statistical values generated from the video data to select, from the plurality of lighting conditions in the table, the lighting condition for the video frame;
adapting spatial noise filter parameters based on the lighting condition determined from the table lookup; and
performing spatial noise filtering of the video data as defined by the adapted spatial noise filter parameters to produce spatially filtered video data.

2. The method of claim 1, further comprising:
adapting temporal noise filter parameters based on the lighting condition; and
performing temporal noise filtering of the spatially filtered video data as defined by the adapted temporal noise filter parameters.

3. The method of claim 2 further comprising:
adapting the temporal noise filtering parameters also based on a measure of a determined amount of motion in the spatially filtered video data.

4. The method of claim 3 further comprising combining an output of the spatial noise filtering and an output of the temporal noise filtering into a noise filtered output, wherein the output of the spatial noise filtering and the output of the temporal noise filtering are individually weighted according to the measure of the determined amount of motion and based on the lighting condition.

5. The method of claim 1, wherein the lighting condition is selected from the group consisting of: indoor light, outdoor light, low lighting level, medium lighting level, and high lighting level.

6. The method of claim 1, wherein the statistical values are received from an image signal processor.

7. The method of claim 1, wherein the statistical values comprise at least two of the following:
lux values;
exposure values;
white balancing gains; and
correlated color temperature.

8. The method of claim 1, wherein the current lighting condition is for an entire video frame.

9. A method of noise filtering, the method comprising:
performing a table lookup in a table to determine a lighting condition for a video frame, wherein the table comprises a plurality of lighting conditions, wherein each of the plurality of lighting conditions in the table corresponds to a particular set of statistical values, wherein the table lookup is performed using statistical values generated by an image signal processor from the video data in the video frame, and wherein the table lookup comprises using the statistical values associated with the video frame to select, from the plurality of lighting conditions in the table, the lighting condition for the video frame;
adapting noise filter parameters for each pixel of a first portion of pixels of the video frame based on the lighting condition and on a determined amount of motion in each pixel of the first portion of pixels;
borrowing adapted noise filter parameters for each pixel of a second portion of pixels of the video frame from a respective pixel of neighboring pixels that are part of the first portion of pixels of the video frame; and
noise filtering each pixel of the video frame as defined by each pixel's corresponding adapted noise filter parameters.

10. The method of claim 9, wherein the pixels of the first portion of pixels and the second portion of pixels are arranged in a spatial pattern so that each pixel of the second portion of pixels is neighboring a pixel of the first portion of pixels.

11. The method of claim 9, wherein the pixels of the first portion of pixels and the pixels of the second portion of pixels are arranged into a temporal pattern, wherein the temporal pattern changes with each successive video frame so that the first portion of pixels comprises different pixels for each video frame such that the noise filtering parameters for each pixel of the video frame will be adapted once every determined number of video frame cycles.

12. The method of claim 9, wherein a ratio of the first portion of pixels to the second portion of pixels is dependent upon video content in the video frame and the lighting condition.

13. The method of claim 9, wherein a ratio of the first portion of pixels to the second portion of pixels is selectable to bring one or more of power and computational budgets below a threshold.

14. The method of claim 9, wherein the statistical values comprise at least two of the following:
lux values;
exposure values;
white balancing gains; and
correlated color temperature.

15. An apparatus comprising:
a video sensor configured to generate a video frame comprising video data for a plurality of pixels;
an image signal processor coupled to the video sensor and configured to generate statistical values based on the video frame; and
a memory coupled to the image signal processor that stores a plurality of lighting conditions, each of the lighting conditions related to corresponding statistical values, wherein statistical values associated with the video frame are used to select a lighting condition from the plurality of lighting conditions;
the apparatus configured to combine an output from a spatial noise filter and an output from a temporal noise filter for a particular pixel of the plurality of pixels, wherein the output from the spatial noise filter and the output from the temporal noise filter are individually weighted according to the particular pixel's level of motion and by the lighting condition;

wherein a spatial noise filter is configured by the apparatus to filter the video data as defined by spatial noise filter parameters that are selected based on the lighting condition.

16. The apparatus of claim 15, wherein the temporal noise filter is configured by the apparatus to filter the video data as defined by temporal noise filter parameters that are determined based on the lighting condition.

17. The apparatus of claim 16, further configured to classify each pixel of the plurality of pixels according to each pixel's level of motion, wherein the temporal noise filter parameters for the particular pixel of the plurality of pixels are adapted based on the particular pixel's level of motion.

18. The apparatus of claim 15, wherein the lighting condition is selected from the group consisting of: indoor light, outdoor light, low lighting level, medium lighting level, and high lighting level.

19. The apparatus of claim 15, wherein the statistical values comprise at least two of the following:
lux values;
exposure values;
white balancing gains; and
correlated color temperature.

* * * * *